United States Patent

[11] 3,608,473

| [72] | Inventors | Joseph J. Kearn<br>San Francisco;<br>Jerome A. Solomon, Millbrae; Richard M. Pearson, San Mateo; Henry B. Booth, Redwood City, all of Calif. |
|---|---|---|
| [21] | Appl. No. | 881,203 |
| [22] | Filed | Dec. 1, 1969 |
| [45] | Patented | Sept. 28, 1971 |
| [73] | Assignee | Luigi's Spaghetti Shack, Inc.<br>San Francisco, Calif. |

[54] APPARATUS FOR COOKING SPAGHETTI AND SIMILAR PASTES
5 Claims, 8 Drawing Figs.

[52] U.S. Cl. ........................................ 99/336, 99/355, 99/407, 99/410, 99/443
[51] Int. Cl. ........................................ A47l 27/12
[50] Field of Search........................................ 99/336, 352, 355, 356, 407, 410, 443 R, 85

[56] References Cited
UNITED STATES PATENTS

| 2,875,682 | 3/1959 | Smoot et al.............. | 99/336 |
|---|---|---|---|
| 3,085,499 | 4/1963 | Leiby ...................... | 99/355 |
| 3,352,686 | 11/1967 | Mancuso et al............ | 99/85 |

*Primary Examiner*—Walter A. Scheel
*Assistant Examiner*—Alan I. Cantor
*Attorney*—Fryer, Tjensvold, Feix, Phillips & Lempio ABSTRACT: Apparatus for cooking pastes such as spaghetti in large quantities including a series of stationary tanks or vessels for retaining water and for processing paste and having metal baskets for holding the paste in the water and hinged with respect to the tanks to enable the quick transfer of the basket contents into an adjacent tank. A final cooking before serving is accomplished in one of several small baskets which are immersed in boiling water for an automatically timed brief period.

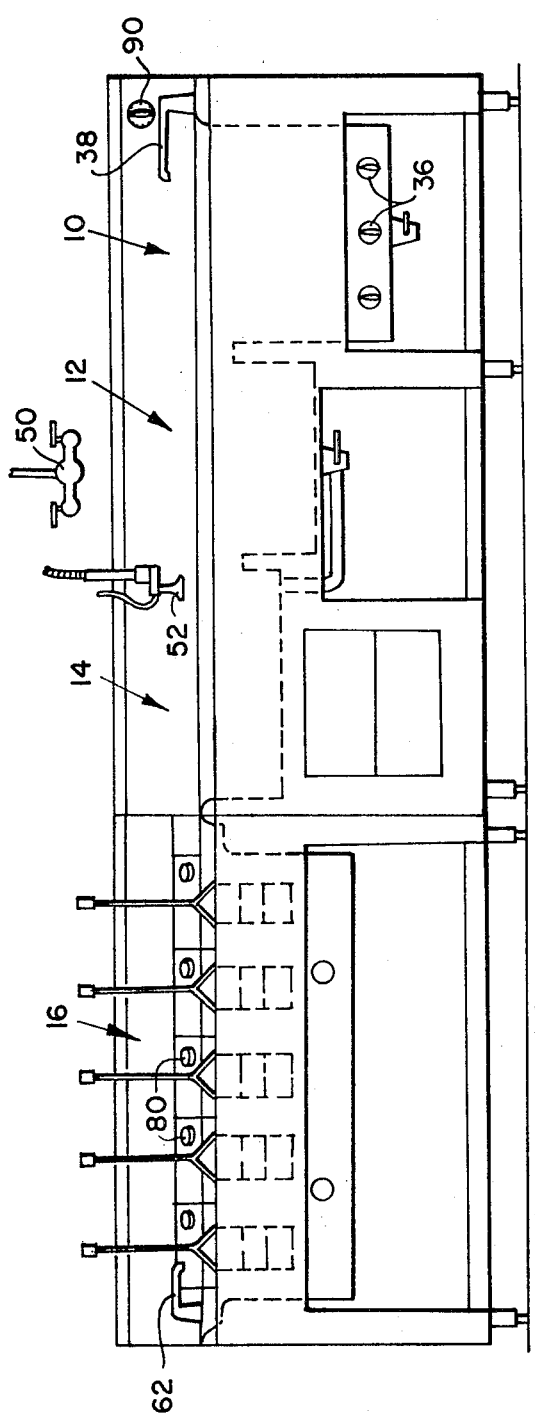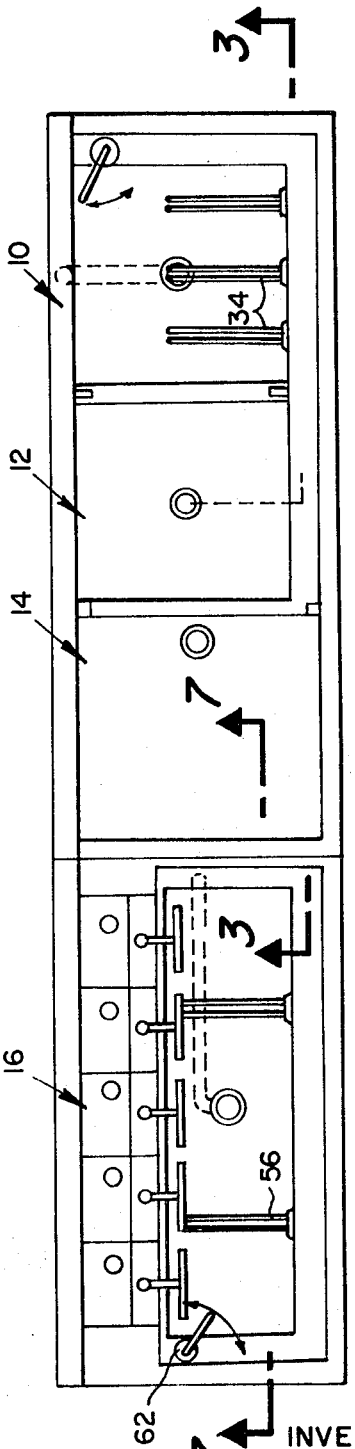

INVENTORS.
JOSEPH J. KEARN
JEROME A. SOLOMON
RICHARD M. PEARSON
HENRY B. BOOTH

BY
*Fryer Tjensvold Feix*
*Phillips & Lempio*
ATTORNEYS

PATENTED SEP 28 1971 3,608,473

INVENTORS.
JOSEPH J. KEARN
JEROME A. SOLOMON
RICHARD M. PEARSON
HENRY B. BOOTH
BY
Phillips & Lempio
ATTORNEYS

APPARATUS FOR COOKING SPAGHETTI AND SIMILAR PASTES

It is recognized that timing is critical in the cooking of spaghetti and similar pastes. It is also known that a product heated for cooking in hot or boiling water will, upon removal from the water, continue to be cooked by residual heat in the product itself. Such aftercooking can be effectively limited by chilling the product with water or ice. This requires removal of the product from the container of hot water and depositing it in another container which takes considerably time when the product is cooked in large quantities and this delays the chilling step.

The present invention overcomes the above-mentioned difficulty by enabling very rapid transfer of a large quantity of spaghetti from one container to another. The invention also provides for chilling the spaghetti so that it may be held in measured portions for servings preferably under refrigeration and provides means for a final brief cooking of such portions to enhance its potability and render it hot for serving.

The invention will best be understood by reading the following description in which reference is made to the accompanying drawings.

In the drawings:

FIG. 1 is a view in front elevation of apparatus embodying the present invention.

FIG. 2 is a plan view of the apparatus shown in FIG. 1.

Referring first to FIGS. 1 and 2 of the drawings, the apparatus of the present invention is illustrated as a long structure comparable in cross-sectional configuration to a kitchen sink cabinet or the like. The structure may be made in several parts if desired so that it may be disposed against angularly related walls or so that additional space may be provided for containerizing and other parts of the preparation of spaghetti for marketing or for serving. The apparatus is divided into several sections including a hot tank or precooker 10, a cold tank 12, a work surface or oiling sink 14 and a final heating tank 16.

Figure 3:
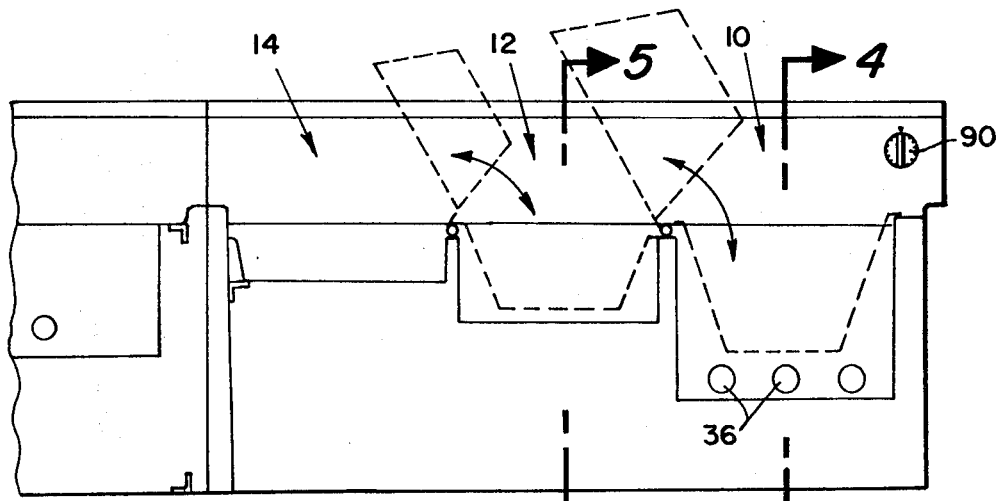
FIG. 3 is a schematic sectional view taken on the line 3—3 of FIG. 2.
Figure 4:
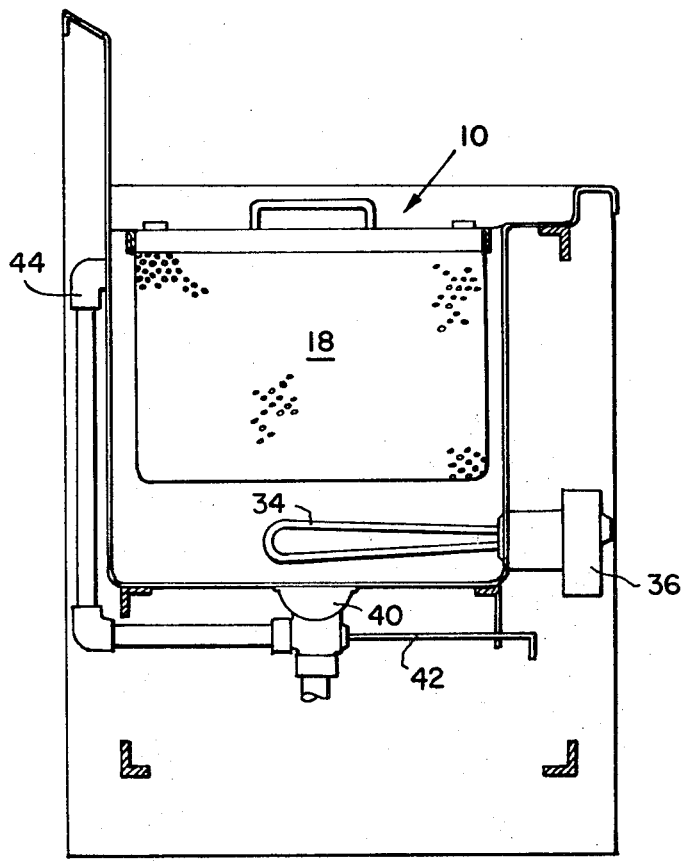
FIG. 4 is a sectional view taken on the line 4—4 of FIG. 3.
Figure 6:
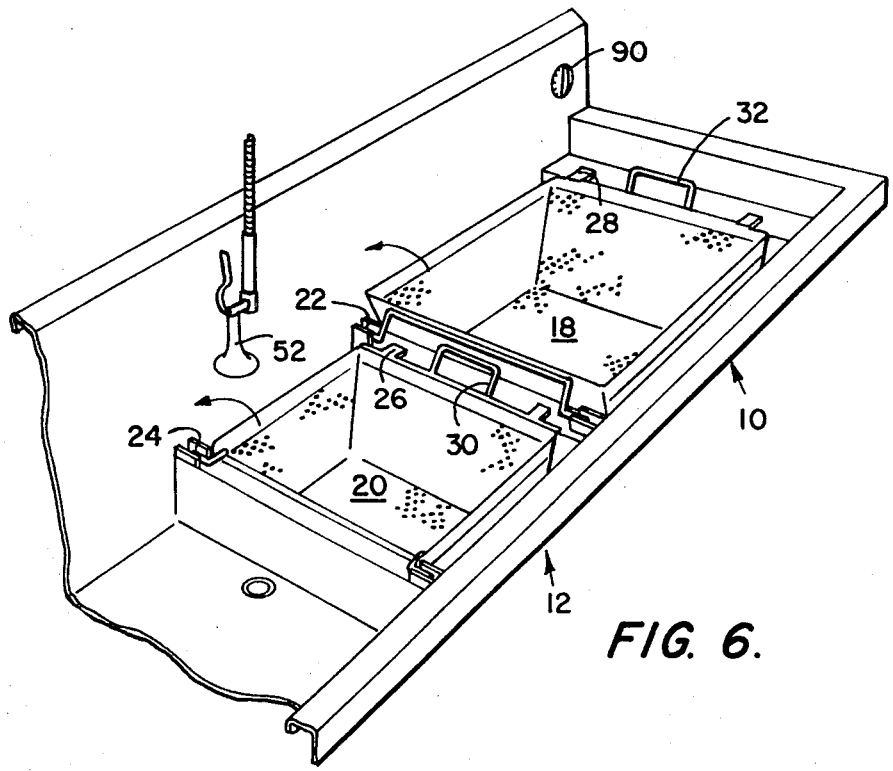
FIG. 6 is a fragmentary perspective view looking downwardly into a cooking tank and a chilling tank which form part of the apparatus.
Figure 5:
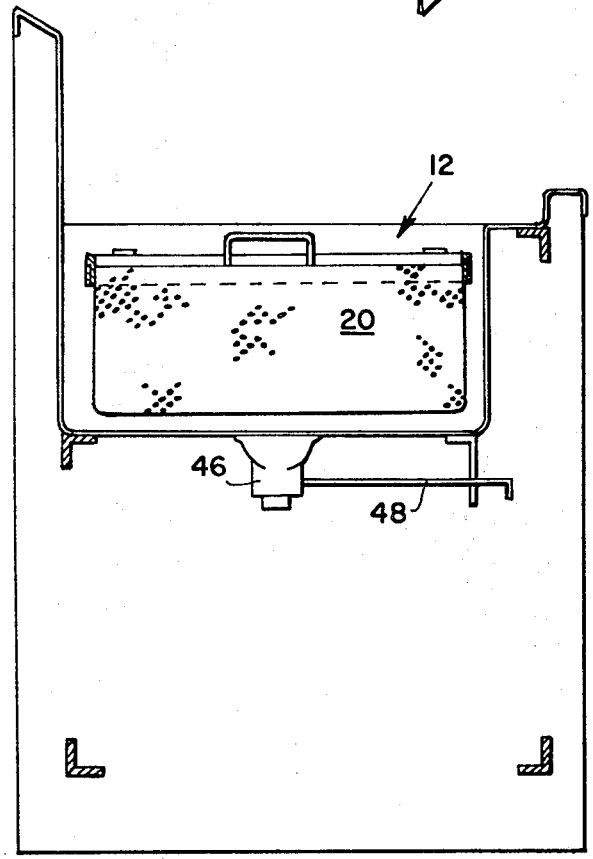
FIG. 5 is a sectional view taken on the line 5—5 of FIG. 3.
Figure 7:
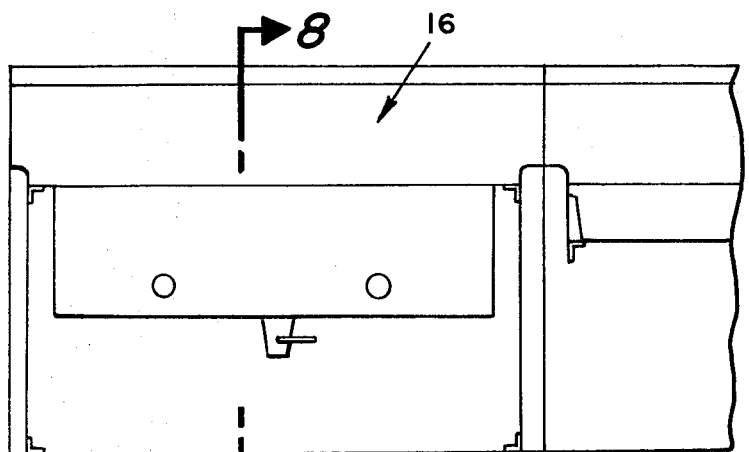
FIG. 7 is a sectional view taken on line 7—7 of FIG. 2.
Figure 8:
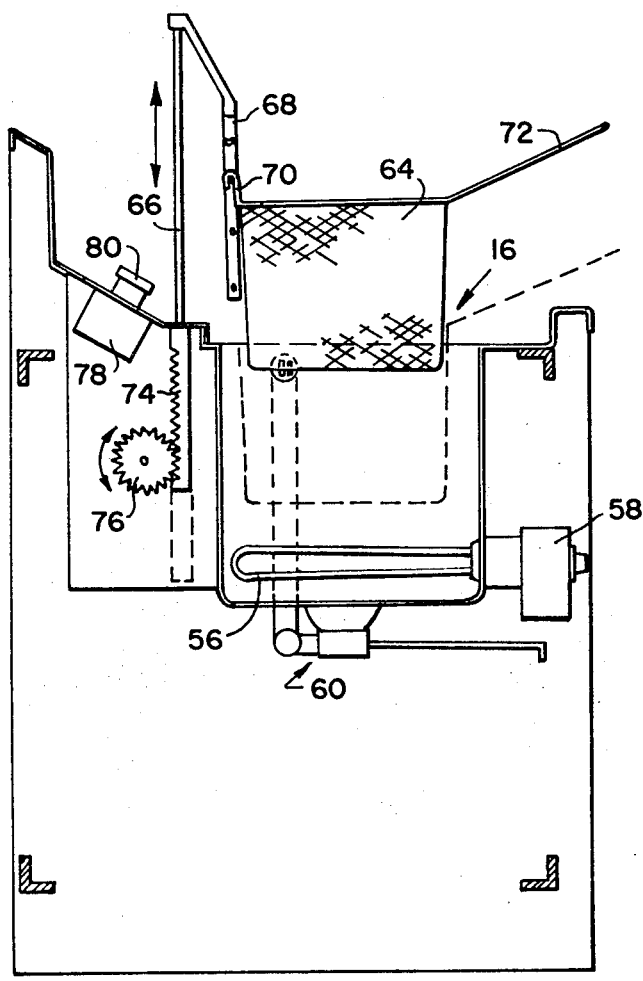
FIG. 8 is a sectional view taken on the line 8—8 of FIG. 7.

The hot tank has a removable perforated basket shown at 18 in FIGS. 4 and 6 and the cold tank has a similar basket shown at 20 in FIGS. 5 and 6. In both cases, the baskets are hinged at one edge by hinges illustrated at 22 and 24 respectively and the hinges comprise pintals disposed in U-shaped brackets to enable lifting of the baskets out of the tanks. At the ends of the baskets opposite the hinges, stops 26 and 28 are provided to rest upon the edge of the tank and hold the baskets in a horizontal position. The baskets are also provided with handles 30 and 32 by means of which they may be raised about their hinges. Referring to FIG. 3, the baskets are represented in dotted lines as contained within the tanks 10 and 12 and are also represented in their raised positions to illustrate that the contents of the basket in the hot tank may be dumped into the basket in the cold tank and that thereafter the basket in the cold tank may be dumped upon the work surface in the area 14.

In FIG. 4, the hot tank is illustrated as containing heaters 34 (See also FIG. 2) and these heaters which are electrical immersion units are controlled by control means represented at 36 shown in FIGS. 1, 3 and 4 which are of conventional construction, the function of the heaters and controls being to heat and control the temperature of water which has been placed in the tank 10 through an inlet spout shown at 38 in FIG. 1.

The tank 10 also has a drain represented at 40 in FIG. 4 and closed by a valve (not shown) which is controlled by a lever 42. A conventional overflow fixture 44 is also associated with the drain. The tank 12 best illustrated in FIG. 5 is similar to the tank 10 having a drain 46 closed by a valve with a control lever 48. There are however no heating elements associated with the tank to which cold water may be delivered as by a fixture 50 (See FIG. 1) associated with a flexible tube and spray head 52 (See also FIG. 6) which enables cooling of the spaghetti in the tank.

The construction of the final heating tank is illustrated in FIGS. 1, 2, 7 and 8 wherein it is shown as having heaters 56 with controls 58, a drain with overflow and valve indicated at 60 and a filling spout shown at 62 in FIGS. 1 and 2. A plurality of small baskets one of which is shown at 64 are provided for use in connection with the final heating tank 16 and a plurality of aligned basket elevators are shown as comprising a vertically movable rod 66 disposed behind the tank and a frame which includes crossbars extending forwardly and downwardly with respect to the rod shown at 68 and capable of supporting the baskets by hook means 70 on one edge of the basket which may be secured to and removed from the elevator through the use of a handle 72. At its lower end, the rod 66 is provided with a rack 74 suitably guided for vertical sliding movement by means not shown and meshing with a driving gear 76. The driving gear is actuated by a motor which is energized and timed by control means represented at 78 provided for the manually set timer dial 80. The motor and circuit therefor which includes means to reverse the direction of movement of the elevator are all conventional and need not be described as they form no part of the present invention. The purpose is, upon actuation of the dial 80 or a suitable switch mechanism thereon, to energize the motor for lowering the basket 64 and its contents into hot water in the tank 10 and permitting it to remain therein for a limited period of time; then, upon reversal of the drive to raise the basket free of the water.

Before describing the cooking and treatment of the product by the apparatus of the present invention, it should be understood that the term "spaghetti" or "paste" as used herein are descriptive of various spaghetti, noodles and macaroni type products generally referred to in Italian and certain other foreign languages as "pasta." Consequently, the temperatures and timing referred to herein by way of example are those used for spaghetti of a certain type and grade, but might be varied considerably in the cooking and treatment of other related products. In an apparatus such as that disclosed herein, a quantity of 20 pounds of dry uncooked spaghetti is deposited in the basket in the hot tank 10, which is also known as a precook tank, with the water in the tank at boiling temperature. The heat delivered by the heating elements within the tank is sufficiently great to restore the water to boiling in a very brief period of time after the temperature has been lowered slightly by immersion of the cold spaghetti in the tank. A timer represented at 90 in FIG. 1 is conveniently located and is set to sound an alarm at 6 minutes after deposit of the spaghetti into the tank. At this time the basket is promptly pivoted to the discharge position illustrated in FIG. 3 so that the precooked spaghetti is deposited in the basket of the cold tank 12. Here the spaghetti is rapidly chilled by cold water from the spray 52 and some chefs prefer to use a quantity of ice together with the water to hasten the chilling and prevent further cooking.

When the spaghetti is satisfactorily chilled, it is transferred to the work surface 14, also referred to as an oiling sink, where a measured quantity of vegetable oil is added and mixed with the spaghetti to prevent sticking together of the particles. The same work surface may be used for containerizing of the spaghetti but when large batches are being repeatedly precooked and cooled, the containerizing may be done at a separate sink or station. It involves measuring the spaghetti into containers of single serving or multiple serving capacities. These containers are then stored, preferably under refrigeration, until the precooked product is to be served. When the product is to be served, either for immediate consumption in a restaurant where the apparatus is being operated or for use in a home, a container with the number of servings ordered is deposited into one of the baskets 64 for final cooking and heating. Upon actuation of the switch, the basket is immersed in the water of tank 16 where the temperature is sufficient to maintain boiling and the timer actuated motor raises the elevator to remove the product from the water after a cooking period of 1½ minutes. This constitutes the final cooking and heating after which the spaghetti is combined with a sauce and served. If it is to be served to a patron of the restaurant the contents of the basket are placed on a plate and the sauce, which has also been heated, is added. If the serving is for home consumption, the finally cooked product in the basket is returned to a container and the sauce is also placed in the container before it is closed. An additional amount of sauce is placed in a separate container. The heat of the product in the container will be retained suitably for consumption at the home unless too much time elapses in transit. Should the product become chilled after proper cooking and treatment in the apparatus, instructions are provided which enable the consumer to reheat it before consumption quickly and with as little further cooking as possible.

In some restaurants, which provide spaghetti, both for consumption on the premises and to take out, several hundreds of pounds will be cooked in one day and this is made possible without the use of cooking vessels of excessive size and with a minimum effort expended in transferring the product being prepared from one vessel to another.

What is claimed is:

1. Apparatus for cooking spaghetti comprising a precooking tank for containing hot water, an adjacent tank for cooling precooked spaghetti, a perforated container in each tank to hold the spaghetti, hinge means on each container to enable it to be raised to discharge its contents, means to deliver cold water to the cooling tank to cool the spaghetti discharged from the precooking tank and means to receive the spaghetti discharged from the cooling tank.

2. The apparatus of claim 1 with a second tank to contain hot water for final cooking, elevators in said second hot water tank with perforated containers for portions of spaghetti to be served, and means to lower the elevators to immerse the spaghetti in the final cooking water.

3. The apparatus of claim 2 in which the containers for the elevators are screen baskets capable of being removed from the elevators.

4. The apparatus of claim 2 with automatically timed reversing means on the elevators to cause them to raise the spaghetti out of the water after a predetermined cooking period.

5. The apparatus of claim 2 in which there are a plurality of said elevators with separate driving and timing means for each.